(12) United States Patent (10) Patent No.: US 7,546,976 B2
Li (45) Date of Patent: Jun. 16, 2009

(54) DUAL POWER HELICOPTER WITHOUT A TAIL ROTOR

(76) Inventor: Hong-Fu Li, P.O. Box No. 6-57, Junghe, Taipei 235 (TW)

( * ) Notice: Subject to any disclaimer, the term of this patent is extended or adjusted under 35 U.S.C. 154(b) by 443 days.

(21) Appl. No.: 11/525,961

(22) Filed: Sep. 25, 2006

(65) Prior Publication Data

US 2009/0127380 A1 May 21, 2009

(51) Int. Cl.
*B64C 27/08* (2006.01)
*B64C 27/12* (2006.01)
*B64D 17/80* (2006.01)
(52) U.S. Cl. .................... 244/17.23; 244/17.15
(58) Field of Classification Search .............. 244/17.15, 244/17.19, 17.21, 17.23

See application file for complete search history.

(56) References Cited

U.S. PATENT DOCUMENTS

| 2,452,726 | A | * | 11/1948 | Buchet | 244/17.23 |
| 3,138,348 | A | * | 6/1964 | Stahmer | 244/17.15 |
| 3,246,861 | A | * | 4/1966 | Curci | 244/7 A |
| 4,703,906 | A | * | 11/1987 | Eickmann | 244/17.23 |

* cited by examiner

*Primary Examiner*—Rob Swiatek (57) ABSTRACT

A dual power helicopter without a tail rotor. The dual power helicopter of present invention primarily uses two power devices which can be rotated in opposite directions to control the flight of the helicopter. The two power devices are rotated in the opposite directions by steering gears from a same engine, such that the engine power can be completely transmitted to the two power devices, enabling the engine power to be completely developed, thereby improving performance of the helicopter.

4 Claims, 11 Drawing Sheets

DUAL POWER HELICOPTER WITHOUT A TAIL ROTOR

BACKGROUND OF THE INVENTION (a) Field of the Invention

The present invention relates to a dual power helicopter without a tail rotor, and more particularly to a helicopter, an ascending and descending power of which is increased through a dual power, and which is especially provided with high power and safety.

(b) Description of the Prior Art

A helicopter has long been a most convenient air traffic vehicle and one of important air forces. The helicopter is widely used in that it can take off and descend vertically without requiring a runway.

However, there is a very serious limitation to the helicopter, resulting from a flight principle of the helicopter.

Figure 1:
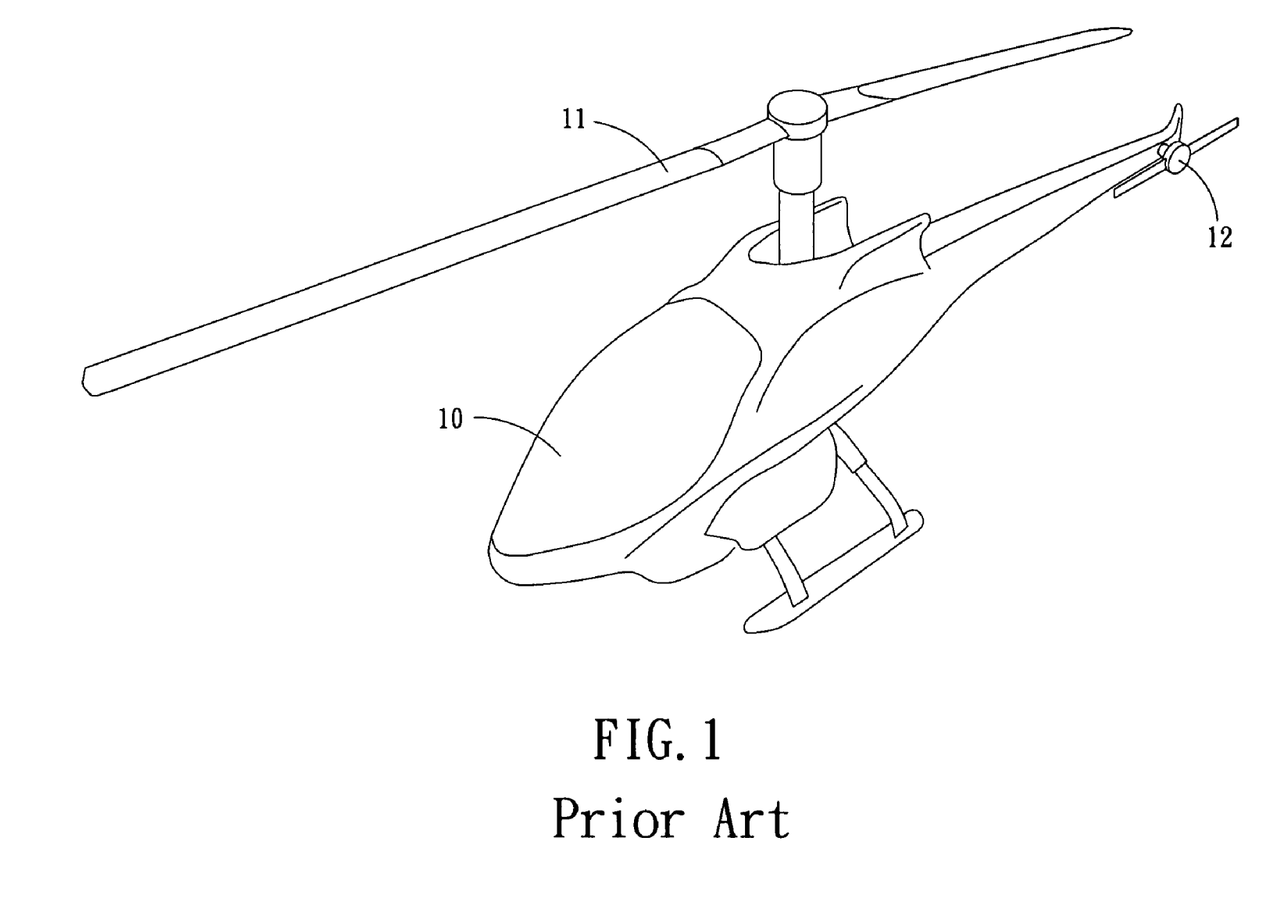
FIG. 1 shows a schematic view of a conventional helicopter.

Referring to FIG. 1, a conventional helicopter includes a cabin 10, an upper end of which is provided with a main rotor 11, and a tail end of which is provided with a tail rotor 12. Axes of the main rotor 11 and the tail rotor 12 are interleaved by 90 degrees, and the two rotors are driven by a same engine power. The main rotor 11 is used to control an ascending and descending, and a traveling movement in front, rear, left, and right directions, of the helicopter; whereas, the tail rotor 12 is used to assist the helicopter to travel in the left and right directions.

Figure 2:
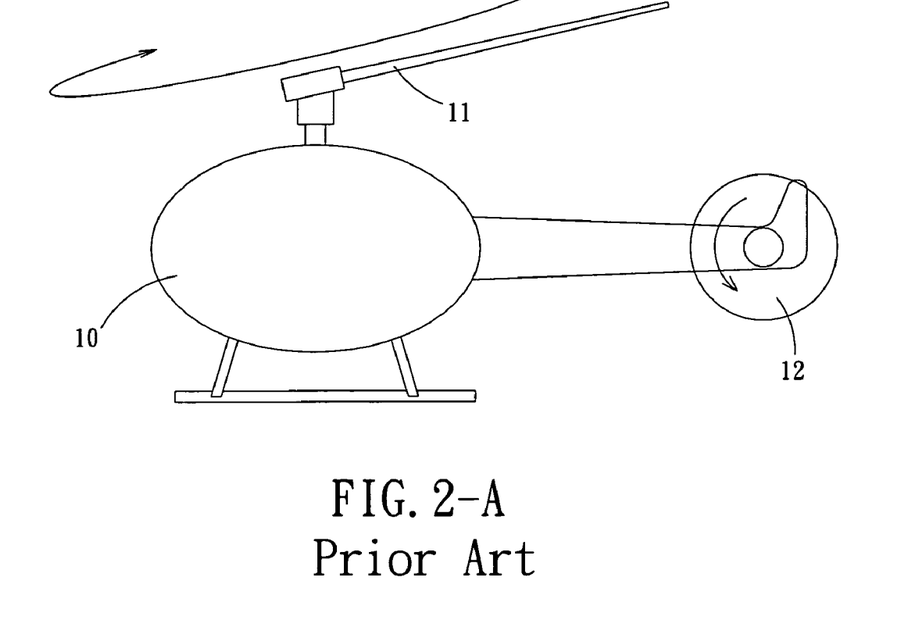

Referring to FIG. 2-A, when the helicopter is to move forward, a pilot is the cabin 10 will push a control lever forward to tilt the main rotor 11 forward, such that the helicopter will move forward through wind power generated by the main rotor 11. Referring to FIG. 2-B, the pilot in the cabin 10 will pull the control lever backward to tilt the main rotor 11 backward, such that the helicopter can move backward.

Figure 3:
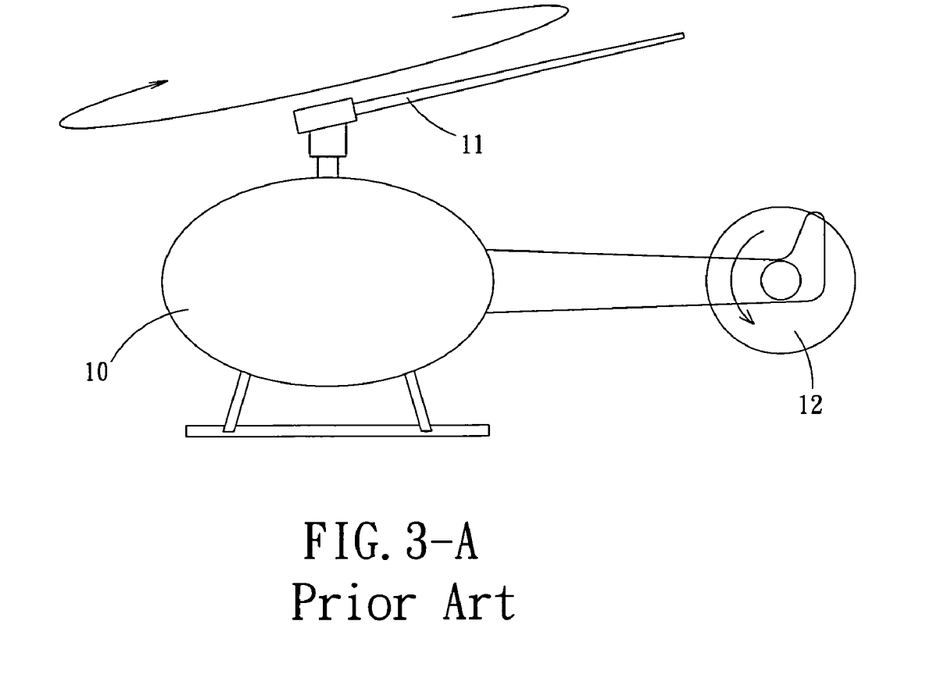

Referring to FIG. 3-A and FIG. 3-B, when the helicopter is to move rightward, the main rotor 11 is primary tilted forward, and is also tilted rightward if it is viewed from a front side (as shown in FIG. 3-B). At this time, the tail rotor 12 provides a high thrust, which will further enable the helicopter to turn right, thereby achieving an effect of traveling toward the right direction. On the other hand, referring to FIG. 3-A and FIG. 3-C, when the helicopter is to move left, the main rotor 11 is primarily tilted forward, and is also tilted leftward if it is viewed from a front side. At this time, the tail rotor 12 provided a lower thrust, thereby enabling the helicopter to move left.

Although the helicopter is a kind of convenient air traffic vehicle, its main rotor 11 is rather complicated, in that in addition to providing the effects of tilting forward and backward, it also needs to provide the effects of tilting leftward and rightward, such that the helicopter can freely fly on a sky. Moreover, the tail rotor 12 needs to provide the high thrust, and at other times, it needs to provide the low thrust; therefore, the structure of tail rotor 12 is also rather complicated.

Accordingly, due to the complicated structures of main rotor 11 and tail rotor of helicopter, it will be very difficult to drive the helicopter, and is easy to result in an unbalanced flight. In addition, speed of the helicopter is limited by the main rotor 11. On the other hand, other than providing the main rotor 11 to operate, the engine also needs to transmit 20% of its power to the tail rotor 12 for keeping a balance of the helicopter; therefore, it will be unable to provide an ascending power. Moreover, as the conventional helicopter is affected by an installation of the main rotor, it cannot be loaded with an ejection seat or a parachute. Therefore, when the helicopter is having a mechanical malfunction, it can only be crashed, thereby causing a casualty to the pilot and passengers.

Accordingly, how to provide a helicopter with high power and safety is an issue to be solved by the present invention.

SUMMARY OF THE INVENTION

The primary object of present invention is to provide a dual power helicopter without a tail rotor, wherein a simple mechanical principle is used to improve the complicated structure of conventional main rotor, and the tail rotor with complicated structure is removed, such that the engine power can develop into a maximum function. In addition, a complete balance is achieved to the aerodynamic force, thereby being able to automatically stabilize the helicopter.

Another object of the present invention is to provide a dual power helicopter without a tail rotor, wherein a parachute can be loaded, such that when the helicopter is losing power from a mechanical malfunction, it can slowly descend through the parachute, thereby achieving an effect of keeping people and the helicopter safe.

Accordingly, a dual power helicopter without a tail rotor of the present invention includes a cabin, a power device, a gear box set, a coupling lever set, and two rotors. The power device is located in an interior of the cabin to provide the engine power. The gear box consists of a main gear box and two secondary gear boxes, wherein the main gear box is connected with the power device, the two secondary gear boxes are located at two sides of the main gear box respectively, are coaxial with the main gear box, and are connected with the two rotors, respectively. The two secondary gear boxes are casings which are installed externally and can be freely rotated, in order to control a swinging of the two rotors. On the other hand, the coupling lever set consists of a control lever installed in an interior of the cabin, which is connected to the outer casings of secondary gear boxes through the plurality of coupling levers, such that the pilot in the cabin can manipulate the control lever to drive the two secondary gear boxes through the plurality of coupling levers, thereby controlling the swinging of two rotors.

However, the two rotors will have different spinning directions through a change of spinning direction resulting from the main gear box and secondary gear boxes, such that the balance of helicopter can be obtained through a left and right spinning of the two rotors, thereby enabling the helicopter to fly more stably. Moreover, through a driving of the coupling lever set, the two secondary gear boxes will have a reverse spinning, to drive the two rotors to be tilted forward and backward, thereby enabling the helicopter to move left or move right through the difference of forward and backward tilting of the two rotors.

Besides, for the dual power helicopter without a tail rotor of present invention, the engine power created by the power device is completely transmitted to the two rotors through the plurality of gear boxes; therefore, this engine power can be completely provided to the two rotors, thereby largely increasing the power of helicopter.

Furthermore, for the dual power helicopter without a tail rotor of present invention, a parachute can be further added on a top end of the cabin. The parachute is collected between the two rotors, and it can be ejected outward through air pressure in order to be prevented from being damaged by the two rotors, such that the helicopter can slowly descend through the parachute, thereby achieving an effect of keeping people and the helicopter safe.

To enable a further understanding of the said objectives and the technological methods of the invention herein, the brief description of the drawings below is followed by the detailed description of the preferred embodiments.

BRIEF DESCRIPTION OF THE DRAWINGS

FIG. 2-A shows a schematic view of a conventional helicopter which is moving forward.

FIG. 2-B shows a schematic view of a conventional helicopter which is moving backward.

FIG. 3-A shows a front view of a conventional helicopter which moves right.

FIG. 3-B shows a side view of a conventional helicopter which moves right.

FIG. 3-C shows a side view of a conventional helicopter which moves left.

FIG. 8-A shows a front view of the present invention which moves right.

FIG. 8-B shows a side view of the present invention which moves right.

FIG. 9-A shows a front view of the present invention which moves left.

FIG. 9-B shows a side view of the present invention which moves left.

DETAILED DESCRIPTION OF THE PREFERRED EMBODIMENTS

Figure 4:
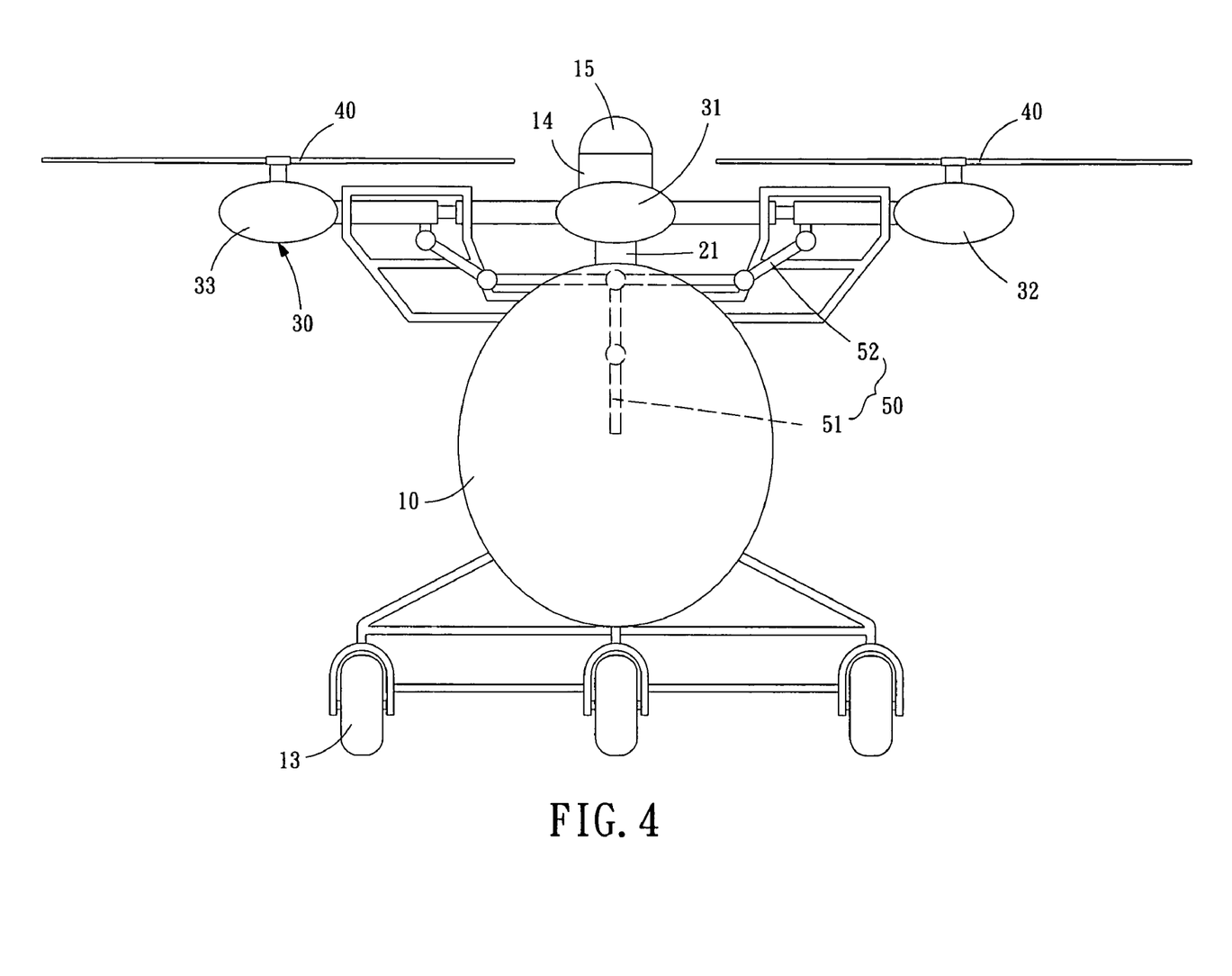
FIG. 4 shows a front view of the present invention.
Figure 5:
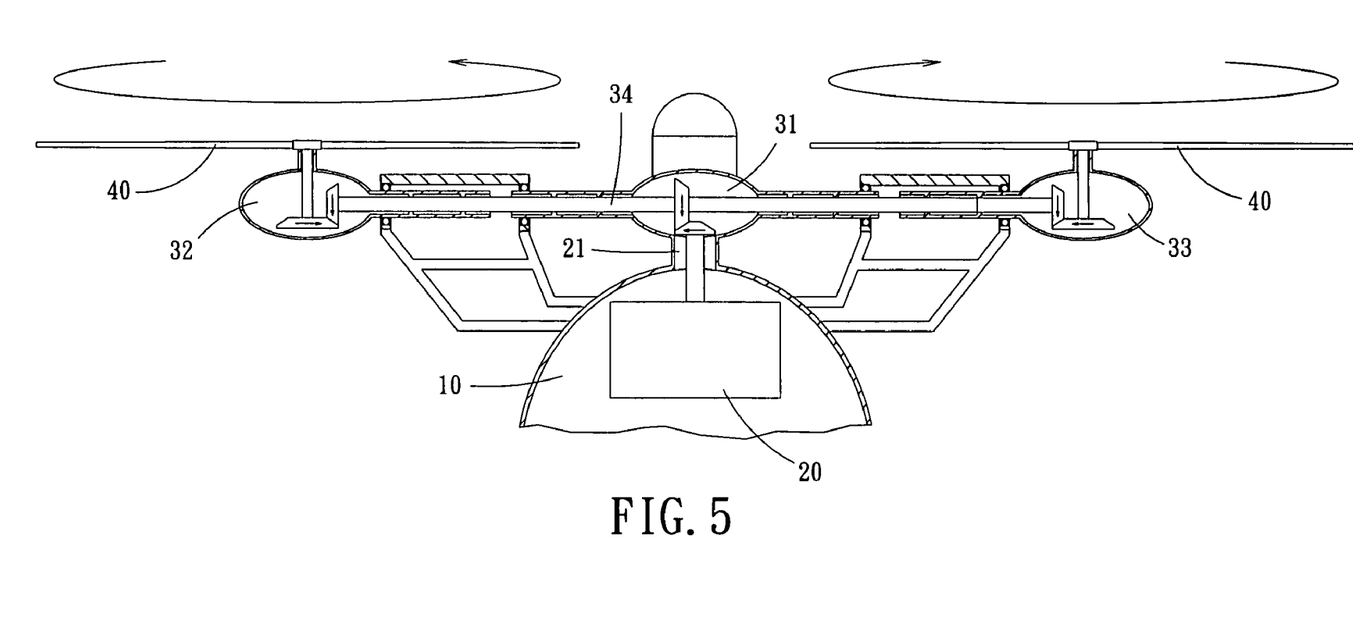
FIG. 5 shows a schematic view of a motion of a power device and a plurality of gear boxes of the present invention.

Referring to FIG. 4, a dual power helicopter without a tail rotor comprises a cabin 10, a power device 20 (as shown in FIG. 5), a gear box set 30, two rotors 40, and a coupling lever set 50.

An interior of the cabin 10 is provided with at least one driving space, and a bottom of the cabin 10 is installed with tires 13.

Referring to FIG. 5, the power device 20, which is installed in an interior of the cabin 10, primarily provides an engine power, and an upper end of the power device 20 is connected with a clutch 21 which is located at an exterior of top end of the cabin 10.

Referring to FIG. 5, a main gear box 31 is installed at an upper end of the clutch 21, and two secondary gear boxes, including a left secondary gear box 32 and a right secondary gear box 33, are located at a left and right sides of the main gear box 31, respectively. A same axis 34 is located between the main gear box 31 and the left, right secondary gear boxes 32, 33 to drive the internal gears, such that a reverse spinning will be formed to the left and right gear boxes 32, 33. In addition, casings at exteriors of the left and right secondary gear boxes 32, 33 can be freely rotated at two sides of the main gear box 31.

The two rotors 40 are located at upper ends of the left and right secondary gear boxes 32, 33 respectively, and a reverse spinning is formed to the two rotors 40, through a driving by the left and right secondary gear boxes 32, 33.

The coupling lever set 50 includes a control lever 51 and a plurality of coupling levers 52. The control lever 51 is located in an interior of the cabin 10, and is connected with the plurality of coupling levers 52 which are connected to the outer casings of left and right secondary gear boxes 32, 33.

Figure 6:
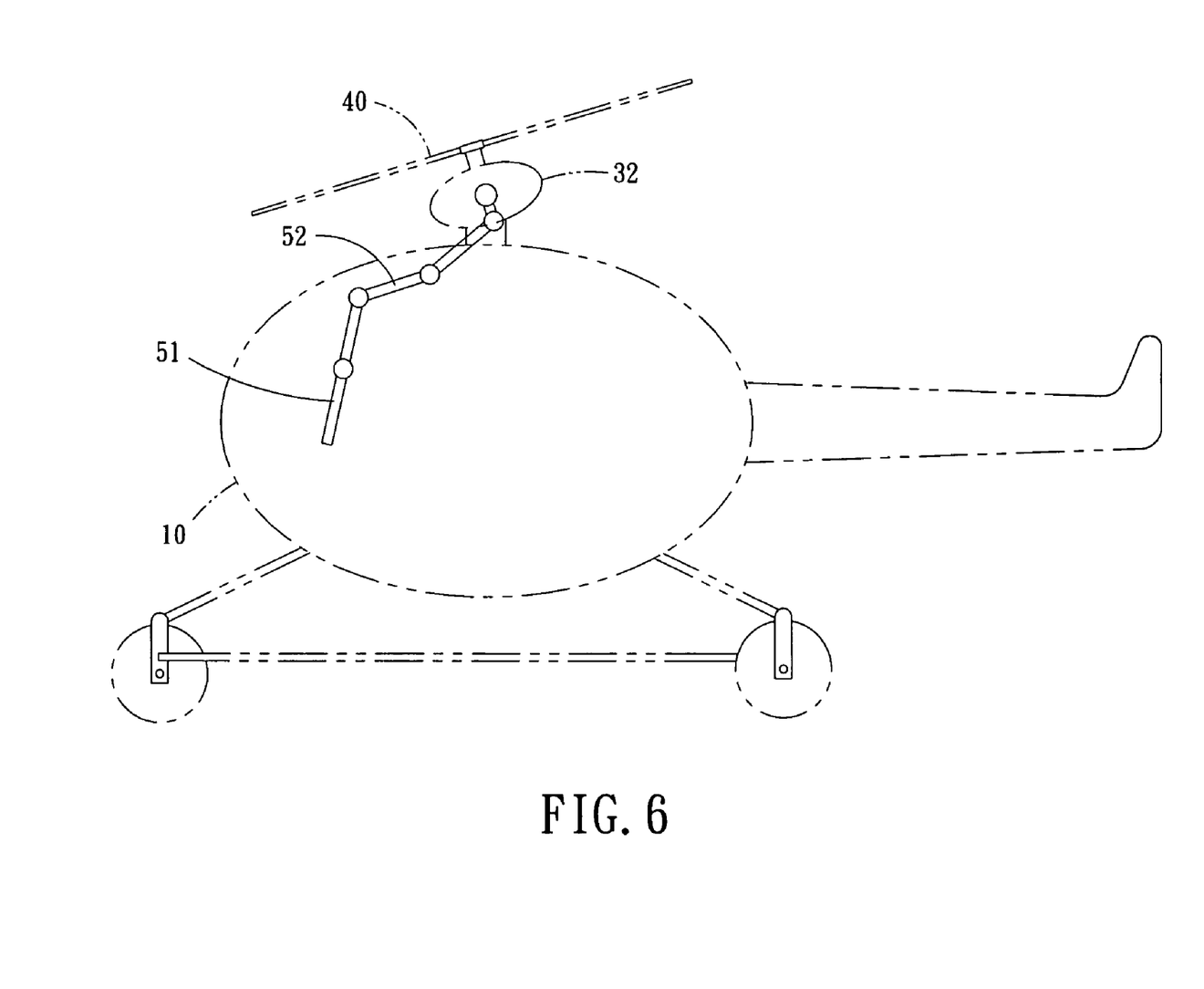
FIG. 6 shows a side view of the present invention which moves forward.
Figure 7:
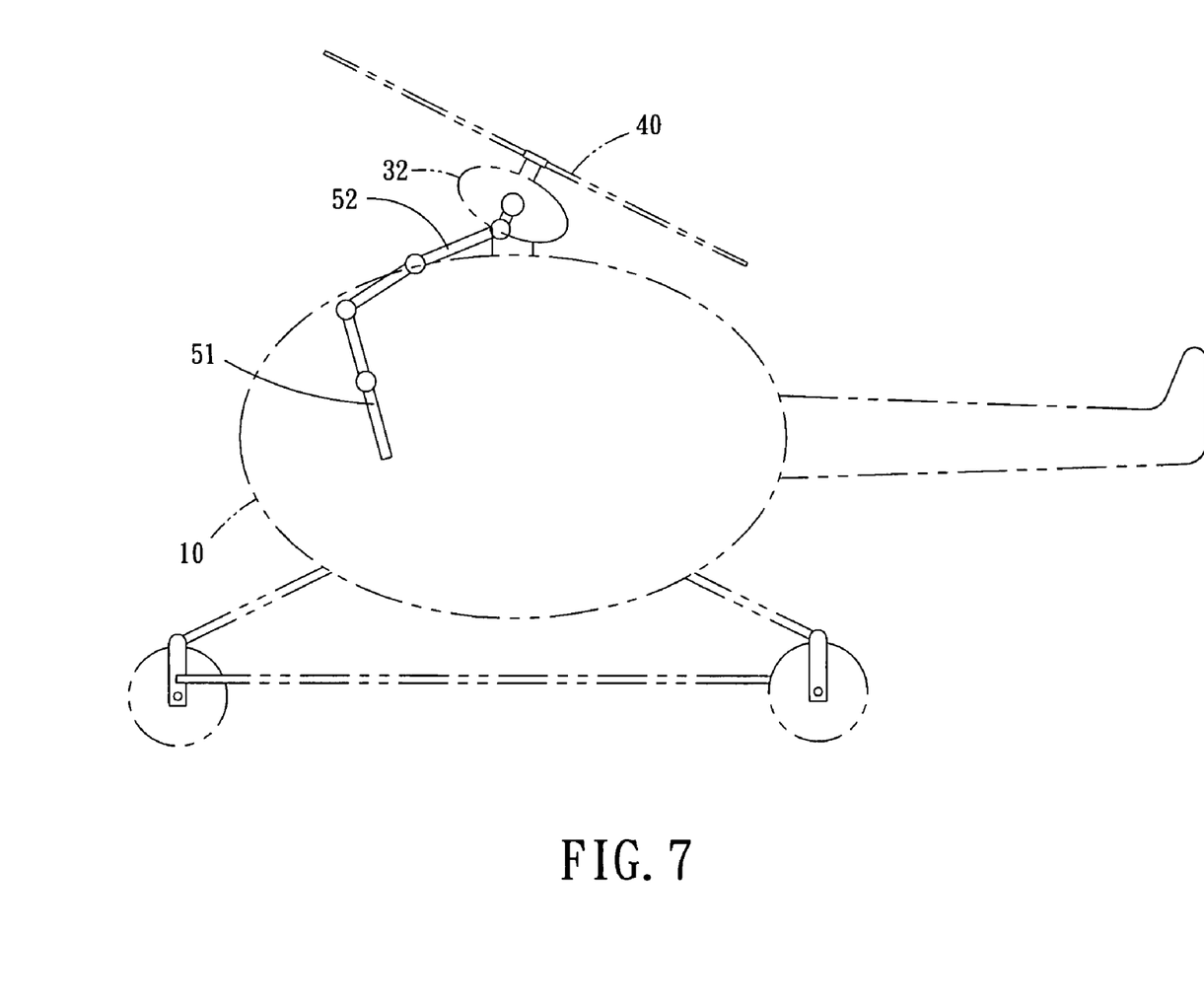
FIG. 7 shows a side view of the present invention which moves backward.

Accordingly, referring to FIG. 6, when the dual power helicopter without a tail rotor of present invention is to move forward, a pilot in the cabin 10 only needs to push the control lever 51 in the cabin 10 forward, to drive the coupling lever 52, thereby driving the left and right secondary gear boxes 32, 33 to be rotated forward a little through the coupling lever 52, so as to tilt the two rotors 40 forward and to achieve an effect of moving forward. On the other hand, referring to FIG. 7, when the pilot in the cabin 10 pulls the control lever 51 backward to drive the coupling lever 52, the left and right secondary gear boxes 32, 33 will be rotated backward a little, thereby driving the two rotors 40 to tilt backward, so as to achieve an effect of moving backward.

Figure 8:
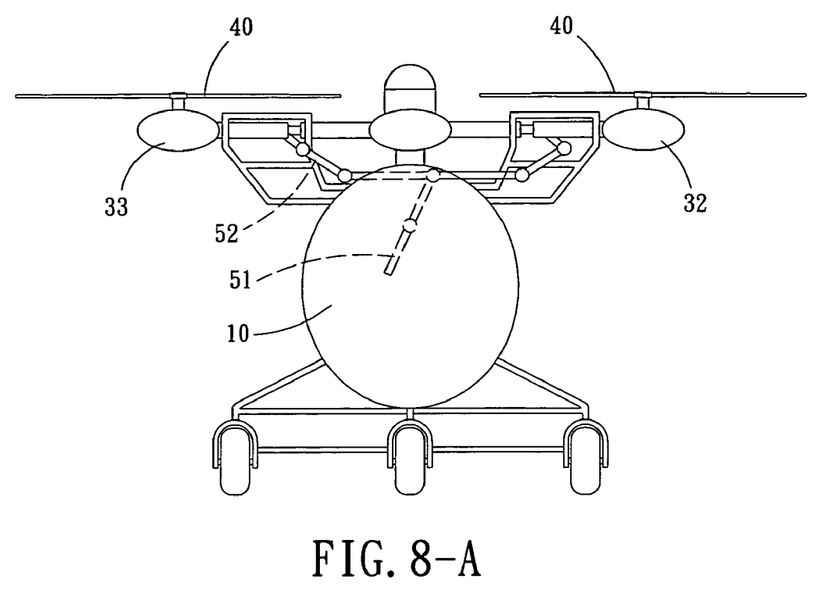

Referring to FIG. 8-A, when the pilot in the cabin 10 pushes the control lever 51 right, the control lever 51 will displace the coupling lever 52 toward a left, which will drive the left and right secondary gear boxes 32, 33 to be rotated in two opposite directions, thereby enabling the two rotors 40 to form a change of direction of tilting forward and backward. In this embodiment, when the control lever 51 is pushed right, the right secondary gear box 32 will be rotated backward through the driving of coupling lever 52, thereby enabling the rotor 50 above the right secondary gear box 32 to tilt backward. Referring to FIG. 8-B, the left secondary gear box 31 will be rotated forward, which enables the rotor 40 above the left secondary gear box 31 to tilt forward. Accordingly, the dual power helicopter without a tail rotor of present invention can turn right.

Figure 9:
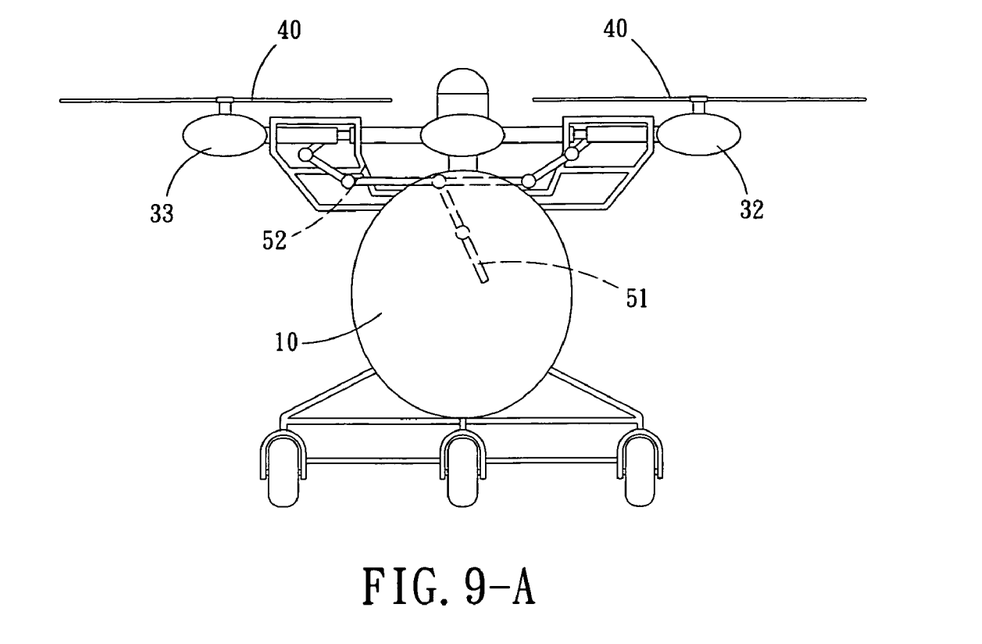

Referring to FIG. 9-A, when the control lever 51 is pushed left, it will drive the coupling lever 52 to be displaced rightward, thereby driving the left and right secondary gear boxes 32, 33 to be rotated reversely, through the coupling lever 52. In this embodiment, when the control lever 51 is pushed left, the left secondary gear box 32 will be rotated backward through the driving of coupling lever 52, thereby enabling the rotor 40 above the left secondary gear box 32 to tilt backward. On the other hand, referring to FIG. 9-B, the right secondary gear box 33 will be rotated forward, enabling the rotor 40 above the right secondary gear box 33 to tilt forward. Accordingly, the dual power helicopter without a tail rotor of present invention can turn left.

Accordingly, the engine power created by the power device 20 can be completely used to drive the two rotors 40 through a transmission of the main gear box 31, the left secondary gear box 32, and the right secondary gear box 33, such that the engine power from the power device can develop into a maximum performance, thereby improving an entire performance of the helicopter.

Figure 10:
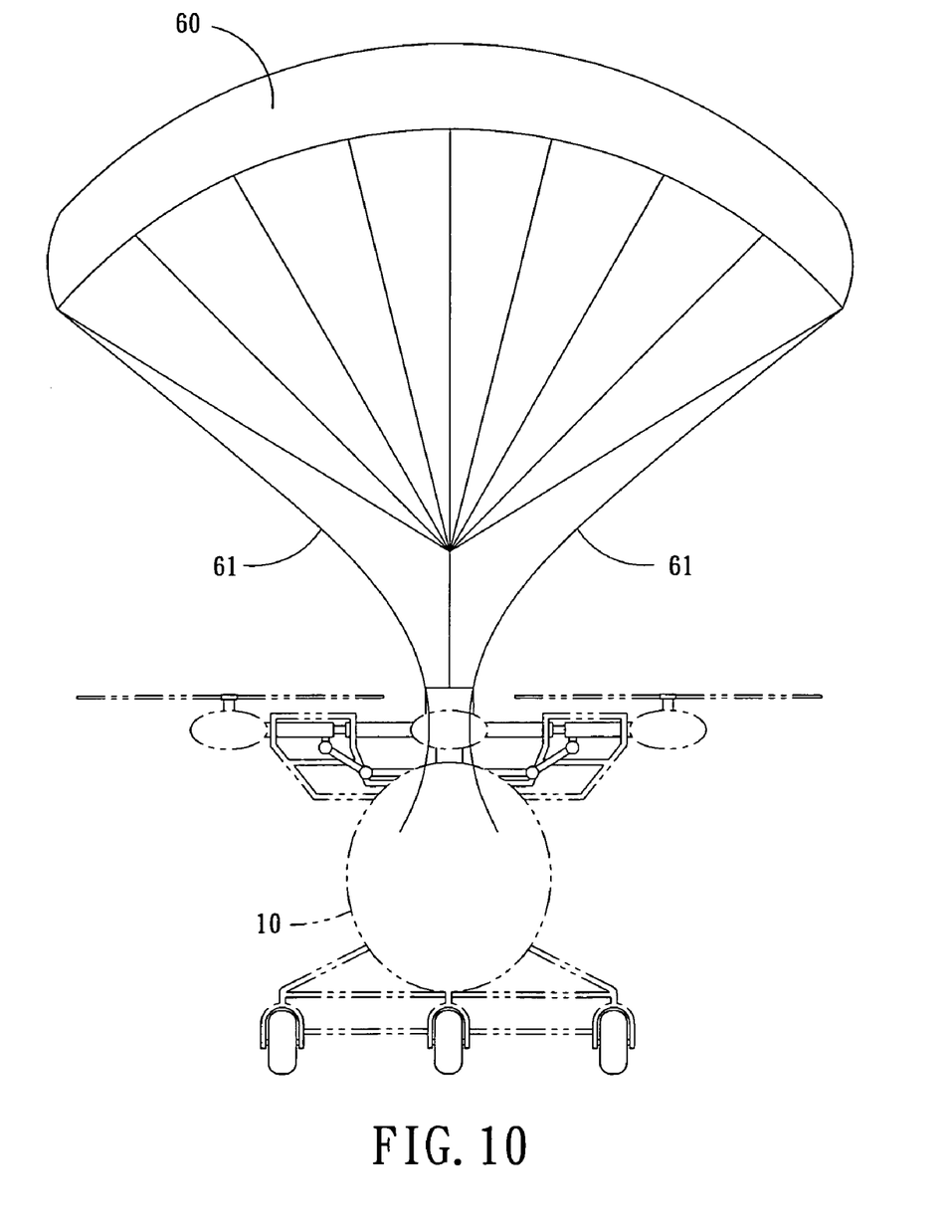
FIG. 10 shows a schematic view of the present invention which uses a parachute.

On the other hand, referring to FIG. 10, in order to enhance a flight safety for the dual power helicopter without a tail rotor of present invention, a top end of the main gear box 31 is further provided with a containing part 14. Referring to FIG. 4, the containing part 14 can be used to collect a parachute 60, such that when the two rotors 40 cannot operate due to that the dual power helicopter without a tail rotor of present invention loses its power, the parachute 60 in the containing part 14 can be ejected timely to suspend the helicopter, such that the dual power helicopter without a tail rotor can slowly descend through the parachute, thereby keeping people and the helicopter safe.

In this embodiment, in order to successfully eject the parachute 60, a top end of the containing part 14 is provided with a cap 15. Before ejecting the parachute 60, the cap 15 is just covered on the containing part 14, but the parachute 60 can be successfully ejected out of the containing part 14 through air pressure, wherein a large quantity of air pressure is filled into the containing part 14, enabling an inner pressure of the containing part 14 to be larger than an ambient atmospheric pressure, thereby pushing out the cap 15 and ejecting out the parachute 60, such that the parachute 60 can be opened timely during an emergency condition to keep people and the helicopter safe.

Besides, the parachute 60 is further provided with control strings 61 at its two sides, which are extended into the cabin 10 respectively, enabling the pilot in the cabin 10 to control a descending direction of the parachute 60 through the two control strings 61, such that the people and helicopter can be landed at a safe place.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A dual power helicopter without a tail rotor comprising a cabin which is provided with at least one driving space; a power device installed in an interior of the cabin, which primarily provides an engine power, and a top end of which is connected with a clutch; a gear box set, including a main gear box and a left and right secondary gear boxes, with the main gear box being located at a top end of the clutch, the left and right secondary gear boxes being located at two sides of the main gear box respectively, the left and right secondary gear boxes being rotated in opposite directions through the main gear box, and outer casings of the left and right secondary gear boxes being freely rotated; two rotors which are located at a top end of the left and right secondary gear boxes respectively; a coupling lever set which includes a control lever and a plurality of coupling levers, with the control lever being installed in an interior of the cabin to be connected to the plurality of coupling levers which are connected to the outer casings of left and right secondary gear boxes, respectively.

2. The dual power helicopter without a tail rotor according to claim 1, wherein a bottom of the cabin is provided with tires.

3. The dual power helicopter without a tail rotor according to claim 1, wherein a top end of the main gear box is further provided with a containing part for collecting a parachute.

4. The dual power helicopter without a tail rotor according to claim 1, wherein a top end of the containing part is provided with a cap and an interior of the containing part is filled with air pressure, enabling the cap and parachute to be ejected at the same time.

* * * * *